May 12, 1931.   L. E. GOULD ET AL   1,804,557
FUEL METERING APPARATUS
Filed Sept. 29, 1928   2 Sheets-Sheet 1
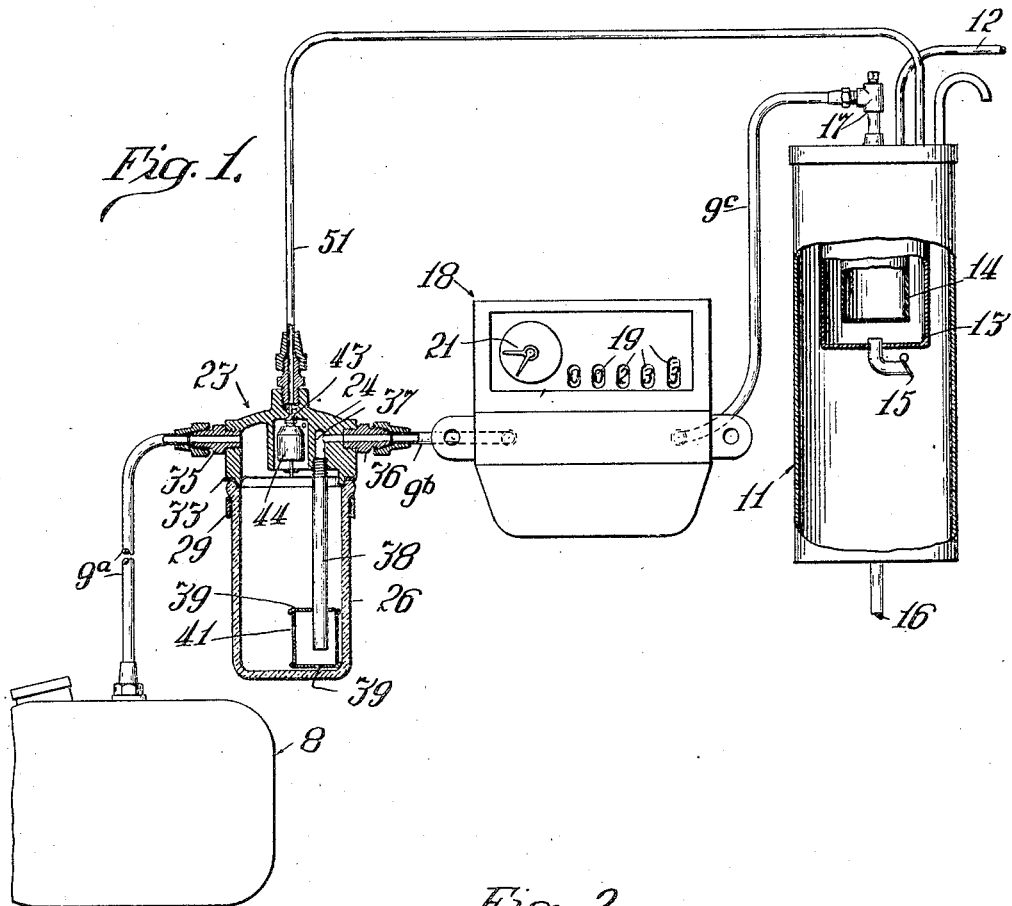
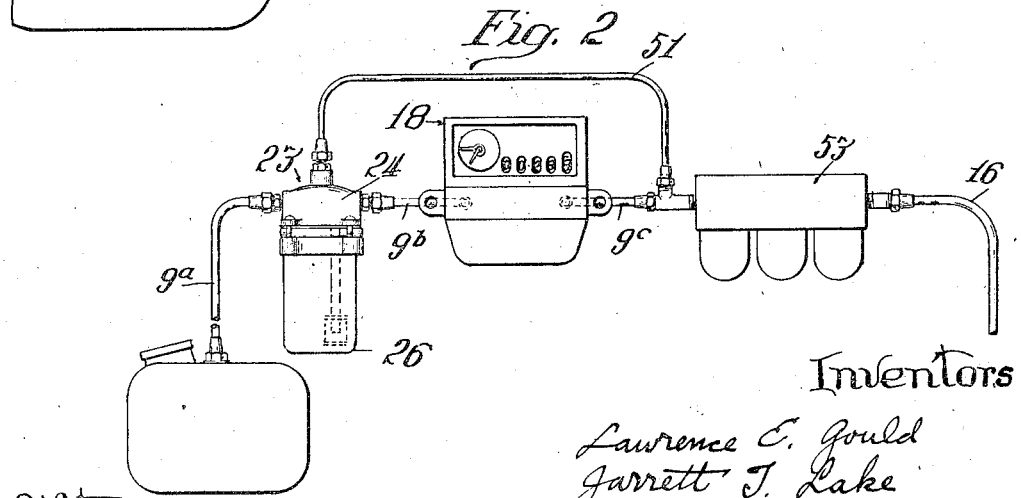

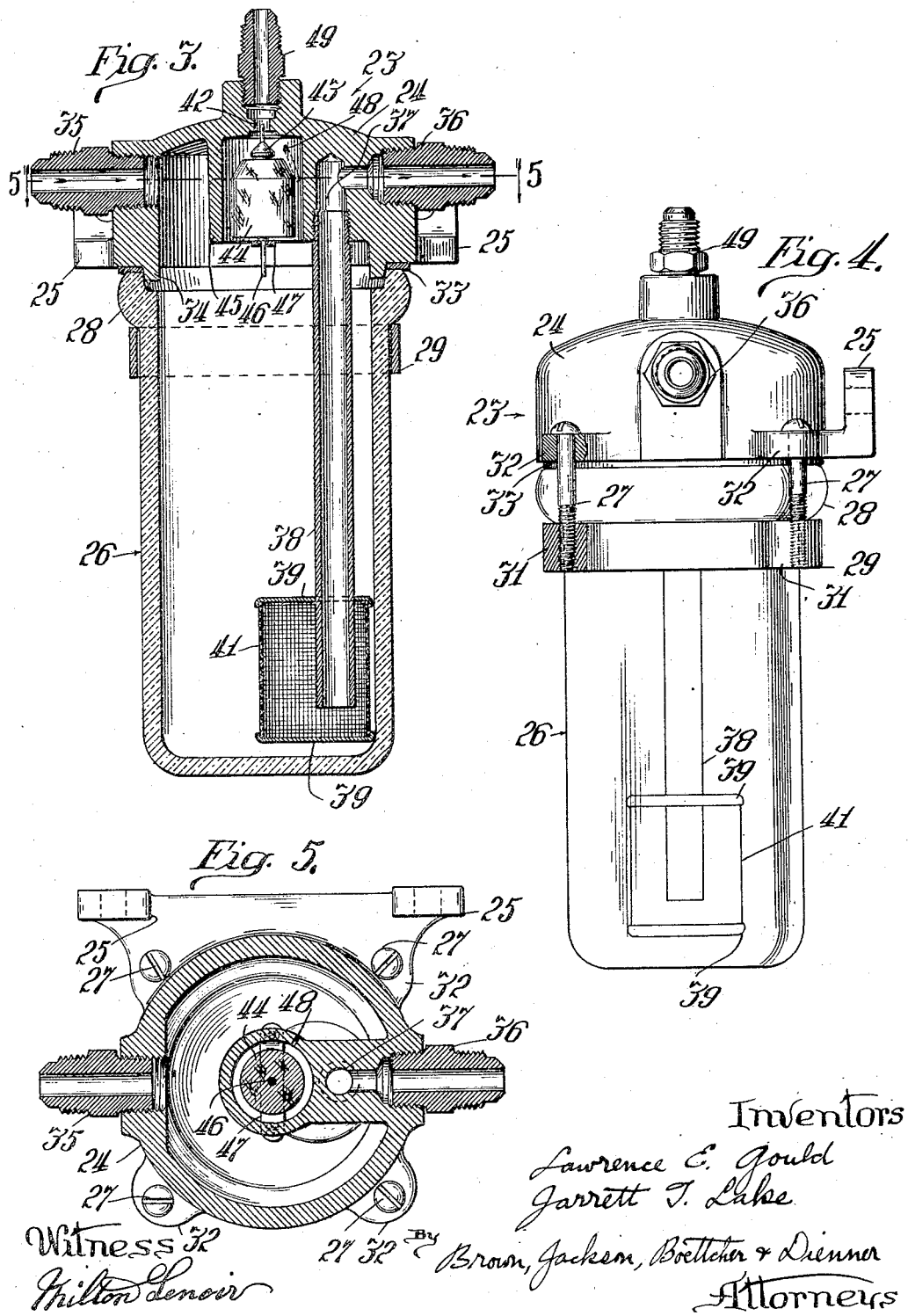

Patented May 12, 1931

1,804,557

UNITED STATES PATENT OFFICE

LAWRENCE E. GOULD, OF CHICAGO, AND JARRETT T. LAKE, OF WILMETTE, ILLINOIS, ASSIGNORS TO ECONOMY ELECTRIC DEVICES CO., OF CHICAGO, ILLINOIS, A CORPORATION OF ILLINOIS

FUEL METERING APPARATUS

Application filed September 29, 1928. Serial No. 309,234.

The present invention relates to fuel metering apparatus or systems such as are employed in motor trucks, busses and other self-propelled vehicles for indicating or registering the consumption of liquid fuel used in their propulsion. This type of apparatus usually comprises a flow meter interposed in the fuel feed line extending between the supply tank and the point of use, such flow meter registering the amount of liquid fuel used and thereby indicating the operating efficiency of the vehicle and of the driver.

We have found that in the majority of these fuel metering systems as heretofore constructed, an appreciable error is introduced in the registration of the meter owing to air being carried through the meter along with the flow of liquid fuel. Such meters are usually of the displacement type, and hence respond to the flow of air therethrough as well as to the flow of fuel. This leakage of air into the fuel feed line may occur in various ways. For example, such leakage may occur through the fittings and connections between the supply tank and the meter, it being almost impossible to maintain this portion of the fuel feed line absolutely air tight. Moreover, when the liquid level in the supply tank is low, the splashing of the fuel therein will frequently admit air to the fuel supply conduit. Likewise, when the vacuum tank ceases drawing fuel there is a tendency for air to leak back into the feed line notwithstanding the provision of a check valve between the feed line and the supply tank, such check valve frequently permitting a slow leak and thereby allowing air to return down through the feed line.

The principal object of the present invention is to avoid these difficulties by providing improved means which will prevent any air flowing up through the fuel feed line from passing through the meter. More specifically, the improved means functions as a trap and by-pass for separating all entrained air from the fuel and by-passing it around the meter. By the provision of this air by-pass, inaccuracies of the meter are reduced to a minimum since the meter then only measures the liquid fuel, and in addition thereto the necessity of maintaining tight joints in the fuel feed line is avoided. Moreover, such device makes it futile to attempt to tamper with the registration of the meter, as is frequently done, such practice consisting in loosening one or more of the connections in the fuel feed line to admit air for the purpose of falsely increasing the reading of the meter. This air by-pass device also avoids the necessity of the check valve which is usually disposed at the supply tank end of the fuel feed conduit, thereby simplifying and facilitating the installation of the metering apparatus.

Another object of the invention is to combine a water and dirt trap with the air by-pass device, thereby preventing accumulations of water or dirt in the flow meter, vacuum tank and carburetor.

Referring now to the accompanying drawings wherein we have illustrated a preferred embodiment of our invention:

Fig. 1 is a diagrammatic view of a fuel feed system, illustrating our improved air by-pass device in conjunction with a flow meter interposed in the system, the system employing a vacuum tank for feeding the fuel;

Fig. 2 is a similar view illustrating the adaptation of the invention to a system employing a different type of fuel feeding device;

Fig. 3 is a vertical sectional view through the combined by-pass chamber and trap;

Fig. 4 is an elevational view thereof taken at right angles to Fig. 3, and

Fig. 5 is a transverse sectional view taken on the plane of the line 5—5 of Fig. 3.

The conventional fuel feed system illustrated in Fig. 1 comprises the main supply tank 8 usually located at the rear of the vehicle, the fuel feed line leading therefrom represented by the three sections of conduit 9a, 9b and 9c, and the well known vacuum tank generally indicated at 11.

This vacuum tank derives its suction from the intake manifold (not shown) of the internal combustion engine through a pipe 12 which communicates with the upper portion of a float chamber 13 in which the float 14 operates. Such float in responding to the level of the fuel in the chamber 13 alternately actuates valves for admitting suction or atmosphere to the chamber 13 in a manner well known. From said chamber the fuel passes through a dump valve 15 down into the lower portion of the vacuum tank, from whence it passes through conduit 16 directly to the carburetor of the internal combustion engine. The fuel feed line 9a—9c opens into the vacuum tank through a fitting 17. It will be understood that when the float 14 lowers it actuates the aforesaid valves to admit suction to the chamber 13, thereby drawing fuel up through the fuel feed line to the vacuum tank, and that when the float rises to a predetermined point it operates through the valve mechanism to admit atmosphere to the chamber 13, thereby interrupting the further feed of fuel to the vacuum tank.

Interposed in this fuel feed line is the flow meter which is indicated in its entirety at 18. Such meter may be of any desired construction, the preferred form illustrated being of the registering cyclometer type comprising a displacement type of measuring chamber connected in the fuel feed line with a rotating element in said chamber responsive to the flow of fuel therethrough.

Said rotating element is operatively connected to drive the cyclometer wheels 19 which indicate the gallons and fractions of a gallon consumed in the operation of the vehicle. A tank dial 21 having a resettable pointer may also be provided on the instrument for indicating the quantity of fuel remaining in the main supply tank 8.

Referring now to the means which we provide to avoid the erroneous registrations frequently occurring in these flow meters through the leakage of air into the fuel feed line, it will be seen that interposed in the supply side of this line is a combined by-pass chamber and trap 23. As shown in Figures 3, 4 and 5, such unit comprises a cap or body portion 24 to which all of the conduit connections are made. Projecting from this cap are bracket lugs or extensions 25 by which the device may be mounted on the front side of the dash or at any other convenient point of support on the vehicle. Depending from this cap is a chamber 26, preferably composed of glass, which is removably secured to the cap by screws 27. The upper end of said chamber is formed with an outwardly projecting bead or flange 28, and encircling the chamber below said bead is a retaining ring or band 29 having threaded bosses 31 at spaced points about its circumference. The screws 27 pass down through apertured lugs 32 projecting from the cap 24 and tap into the threaded lugs 31, drawing the upper edge of the chamber 26 against a sealing gasket 33 which bears against the bottom of the cap 24 outside of a depending flange 34.

Inlet communication to the by-pass chamber is through a nipple 35 which connects with the conduit section 9a and screws into the side of the cap 24. Outlet communication from the by-pass chamber is through a nipple 36 extending from the opposite side of the cap 24 and adapted for connection with the conduit section 9b leading to the flow meter 18. The latter nipple communicates with a vertical bore 37 formed in the cap 24 and screwing into the lower end of this bore is a vertical tube 38 which extends down to a point adjacent to the bottom of the chamber 26. The lower end of said tube 38 extends into a straining screen comprising upper and lower discs 39 between which is disposed a cylindrical gauze screen 41.

The by-passing of the air from the chamber 23 occurs through an upper port 42 in the top of the cap 24, which port is controlled by a valve 43 mounted on the upper end of a float 44. The float and valve are confined in a hollow cylindrical boss 45 depending from the top of the cap, said boss serving as an enclosing cage for the float and valve and preventing the fuel entering through the inlet nipple 35 from splashing out through the air by-pass port 42. The float is guided for vertical movement within this enclosing chamber by a pin 46 extending through the float and valve and engaging at its upper end in the port 42 and at its lower end in an apertured bridge member 47 extending across the open bottom of the boss 45.

To prevent the trapping of air in the upper part of the guide boss and to maintain the same level of fuel inside of this boss as outside, a vent 48 is extended through the wall of the boss adjacent to its upper end to establish communication between the inner and outer sides thereof. As shown in Fig. 5, this vent is disposed on the far side of the boss with respect to the inlet nipple 35 so that entering fuel cannot splash through such vent and be carried up through the air by-pass port 42. A nipple fitting 49 screws into the top of the cap 24 and establishes communication between the by-pass port 42 and a tube 51 which leads to a suitable source of suction. As shown in Fig. 1, the preferred arrangement is to extend the tube 51 to the vacuum tank 11 and connect the same with the float chamber 13 so that the tube 51 is subjected to an aspirating suction each time that the float operated valve mechanism in the vacuum tank subjects the interior of the float chamber 13 to the suction. The float 44 in the by-pass chamber is made of such weight that suction alone cannot lift the valve 43 up against the port 42, it being necessary that the rising fuel level in said chamber carry the float upwardly to seat the valve. However, the weight of the valve is such that when thus seated the suction transmitted through conduit 51 will be effective to hold it to its seat. If desired, the tube 51 may be connected directly with the intake manifold of the engine, in which instance the float valve 43 is preferably made sufficiently heavy that it will not remain seated except when the float is supported by fuel.

In the operation of the embodiment shown in Fig. 1, during the idle or non-operating periods of the vacuum tank 11 the float valve 43 in the by-pass or separating chamber 23 is in its lower position and no fuel is being drawn into this chamber from the supply tank 8, since no suction is being transmitted at this time through either of the conduits 9b—9c and 51. When the vacuum tank is energized in a fuel lifting operation, the suction effective in the float chamber 13 is transmitted through the tube 51 to the separating chamber 23, causing the fuel to be drawn up into this chamber from the supply tank 8. Fuel continues to enter the chamber 23 until the level thereof raises the float 44 and seats the valve 43 against the port 42. Thereupon the suction effective upon the upper end of the fuel feed line 9b—9c causes the fuel to be drawn from chamber 23 up through pipe 38 and through the flow meter 18 to the vacuum tank. As previously remarked, in the embodiment of the invention, the float valve 43 is made sufficiently light so that after the same is seated the suction transmitted through by-pass conduit 51 will hold the float valve to its seat notwithstanding any variation of the liquid level in the chamber 23. With the float valve thus held to its seat the fuel feeds directly from the supply tank 8 to the vacuum tank 11 as though the chamber 23 were not in the system. However, whatever air is entrained in this fuel is separated out in the separating chamber 23 and accumulates in the upper portion thereof, for venting when the float valve 43 drops from its seat. This occurs when the chamber 13 in the vacuum tank has received its required charge, resulting in the float 14 opening its associated valve to admit atmosphere to the chamber 13 and to the conduit 51. When the vacuum tank ceases operating, the quantity of fuel accumulated in the separating chamber 23 is maintained therein ready for the next operation.

In the installation of the apparatus, the separating chamber 23 is preferably placed at the same or in proximity to the same level as the vacuum tank 11 so that upon cessation of operation of the vacuum tank there will be no tendency of the fuel in the vacuum tank end of the fuel feed line 9c to drain back into the separating chamber 23. This avoids reversed flow of the liquid through the flow meter 18. The interposition of the separating chamber 23 in the fuel feed line, and its location with respect to the vacuum tank, avoid the necessity of the check valve usually provided in the fuel feed line adjacent to the supply tank 8. The capacity of the separating chamber 23 is preferably larger than that of the float chamber 13 of the vacuum tank.

It will be observed that any air or other gaseous vapor passing up with the fuel through the feed line section 9a will be separated from the liquid in the chamber 23. This naturally follows because the liquid is drawn from the lower end of the pipe 38, which is always maintained under a liquid seal, whereas the air accumulating in the upper part of the chamber is drawn out through the by-pass port 42. Such air is shunted around the flow meter 18 through the tube 51, leaving only the liquid fuel to pass through the meter and hence avoiding the erroneous registrations which arise when air is also passed through the meter along with the fuel.

In addition to separating entrained air from the fuel, the chamber 23 also separates water and dirt therefrom, as previously described. Any rust or dirt is caught in the meshes of the gauze screen 41 or falls to the bottom of the glass chamber 26. Any water carried up with the fuel also accumulates in the bottom of said chamber, the lower end of the pipe 38 being spaced sufficiently therefrom to permit of a considerable accumulation of water before the same can be drawn through the pipe. Such accumulations of dirt and water are readily visible through the glass chamber 26, and can be removed therefrom by releasing the screws 27 and dumping said chamber.

When the by-pass pipe 51 is connected directly to the intake manifold the substantially continuous suction maintained in said tube will tend to retain a full charge of fuel in the separating chamber 23 at all times. In such embodiment the float valve 43 is made sufficiently heavy so that suction alone will not hold it to its seat, it also requiring the buoyancy of the fuel to remain in this position. When the vacuum tank operates it draws fuel from the chamber 23 until the float valve 43 lowers and admits fuel lifting suction to the upper part of the chamber. With the feed of more fuel to this chamber said float valve again closes and fuel is then fed to the flow meter, these two operations being closely intermittent, or more or less continuous.

It will be understood that the present apparatus is also adaptable with equal advantage to other fuel feed systems employing electrically or mechanically driven pump or other forms of pumping apparatus in lieu of the conventional vacuum tank 11.

Figure 2 illustrates such an installation, the element indicated at 53 representing such pump for feedng fuel from the supply tank to the carburetor of the engine. As in the previously described embodiment, the air by-pass conduit is extended in shunt around the flow meter 18 and is connected either to the inlet side of the pumping element or is connected to the intake manifold.

While the construction illustrated and described constitutes what we regard as the preferred embodiment of our invention, it will be understood that the invention is not limited to the particulars of this construction.

We claim:

1. In a liquid fuel supply system, the combination of a supply tank, a vacuum feed tank, a flow meter and a separating chamber, a fuel feed conduit connecting in series from said supply tank to said separating chamber and from said chamber to said flow meter and from said flow meter to said vacuum feed tank, said separating chamber comprising a removable glass receptacle serving as a water and dirt trap, an outlet duct communicating with the outlet port of said separating chamber and extending down to a point adjacent to the bottom of said glass receptacle, a straining screen surrounding the lower end of said duct, an air by-pass port opening from the upper portion of said separating chamber, a conduit extending from said duct to said vacuum feed tank for shunting air around said flow meter, and a float controlled valve in said separating chamber for controlling said air by-pass port.

2. A liquid fuel supply system comprising a source of fuel supply, a suction operating fuel feed device, a conduit extending between said source of fuel supply and said fuel feed device, a registering flow meter interposed in said conduit, and a separating chamber interposed in said conduit between said source of fuel supply and said flow meter, said separating chamber comprising fuel inlet and outlet ports, said fuel outlet port drawing fuel from the lower portion of said chamber, an air by-pass port communicating with the upper portion of said chamber, a conduit extending from said by-pass port to a source of suction, a float controlled valve controlling said by-pass port, and means interposed between said fuel inlet port and said by-pass for preventing fuel entering through said inlet port from splashing out through said by-pass port.

3. In a liquid fuel supply system, the combination with a supply tank, a vacuum feed tank adapted to receive the fuel, and a flow meter connected with said vacuum feed tank for measuring and indicating the quantity of fuel conveyed to said latter tank, of means for conveying the fuel from said supply tank to said flow meter, said means affording a duct between said supply tank and the flow responsive element of said meter which is permanently open under all operating conditions of the system, means for by-passing air and vapor around the flow responsive element of the meter, and a float controlled valve for controlling said by-pass means.

4. In a liquid fuel supply system, the combination with a supply tank, a receiving receptacle adapted to receive the fuel, and a flow meter connected with said receiving receptacle for measuring and indicating the quantity of fuel conveyed thereto, of means for conveying the fuel from said supply tank to said flow meter, said means affording a continuously open duct between said tank and the flow responsive element of said meter, means for by-passing air and vapor around the flow responsive element of the meter, and float means for controlling said by-pass means.

In witness whereof we hereunto subscribe our hands this 19th day of September, 1928.

LAWRENCE E. GOULD.
JARRETT T. LAKE.